US011105049B2

(12) United States Patent
Jacob

(10) Patent No.: US 11,105,049 B2
(45) Date of Patent: Aug. 31, 2021

(54) ROADBUILDING MACHINE AND METHOD FOR OPERATING A ROADBUILDING MACHINE

(71) Applicant: Dynapac GmbH, Wardenburg (DE)

(72) Inventor: Anup Jacob, Hamburg (DE)

(73) Assignee: Dynapac GmbH, Wardenburg (DE)

( * ) Notice: Subject to any disclaimer, the term of this patent is extended or adjusted under 35 U.S.C. 154(b) by 196 days.

(21) Appl. No.: 16/505,931

(22) Filed: Jul. 9, 2019

(65) Prior Publication Data
US 2020/0011017 A1 Jan. 9, 2020

(30) Foreign Application Priority Data

Jul. 9, 2018 (DE) .......................... 102018005387.4
Jul. 12, 2018 (DE) .......................... 102018005534.6

(51) Int. Cl.
*E01C 19/48* (2006.01)
*G05D 1/00* (2006.01)

(52) U.S. Cl.
CPC ........ *E01C 19/4873* (2013.01); *G05D 1/0011* (2013.01); *G05D 1/0016* (2013.01); *G05D 1/0022* (2013.01); *E01C 2301/00* (2013.01); *G05D 2201/0202* (2013.01)

(58) Field of Classification Search
CPC .. E01C 19/4873; E01C 2301/00; E01C 19/48; G05D 1/0011; G05D 1/0016; G05D 1/0022; G05D 2201/0202
USPC .......................................................... 701/2
See application file for complete search history.

(56) References Cited

U.S. PATENT DOCUMENTS

| 6,099,205 | A | * | 8/2000 | Macku | ................ E01C 19/1077 404/101 |
| 2002/0189220 | A1 | * | 12/2002 | Beck | .................... A01B 69/008 56/10.8 |
| 2007/0098496 | A1 | * | 5/2007 | Hall | ........................ C04B 26/26 404/94 |

FOREIGN PATENT DOCUMENTS

| DE | 102015008315 A1 | 1/2017 |
| DE | 102016004197 A1 | 10/2017 |
| EP | 2963181 A1 | 1/2016 |
| EP | 3067774 A1 | 9/2016 |
| JP | H06149349 A | 5/1994 |

OTHER PUBLICATIONS

European Patent Office, Europaischer Recherchenbericht (search in a related application), dated Nov. 7, 2019.

* cited by examiner

*Primary Examiner* — Muhammad Shafi
(74) *Attorney, Agent, or Firm* — Laurence P. Colton; Smith Tempel Blaha LLC

(57) ABSTRACT

A method for operating a roadbuilding machine and a roadbuilding machine, in which the health risks to the operator during operation are reduced without the paving quality of the roadbuilding material being reduced in the process. This is achieved by way of an undercarriage and/or at least one further component or, respectively, working component of the roadbuilding machine being remotely controlled by an operator, who is located outside the roadbuilding machine, via a transmitting module. In order to operate a roadbuilding machine, an operator is tied to the roadbuilding machine and therefore exposed to harmful fumes. In addition, the flexibility of the operator is reduced as a result.

14 Claims, 1 Drawing Sheet

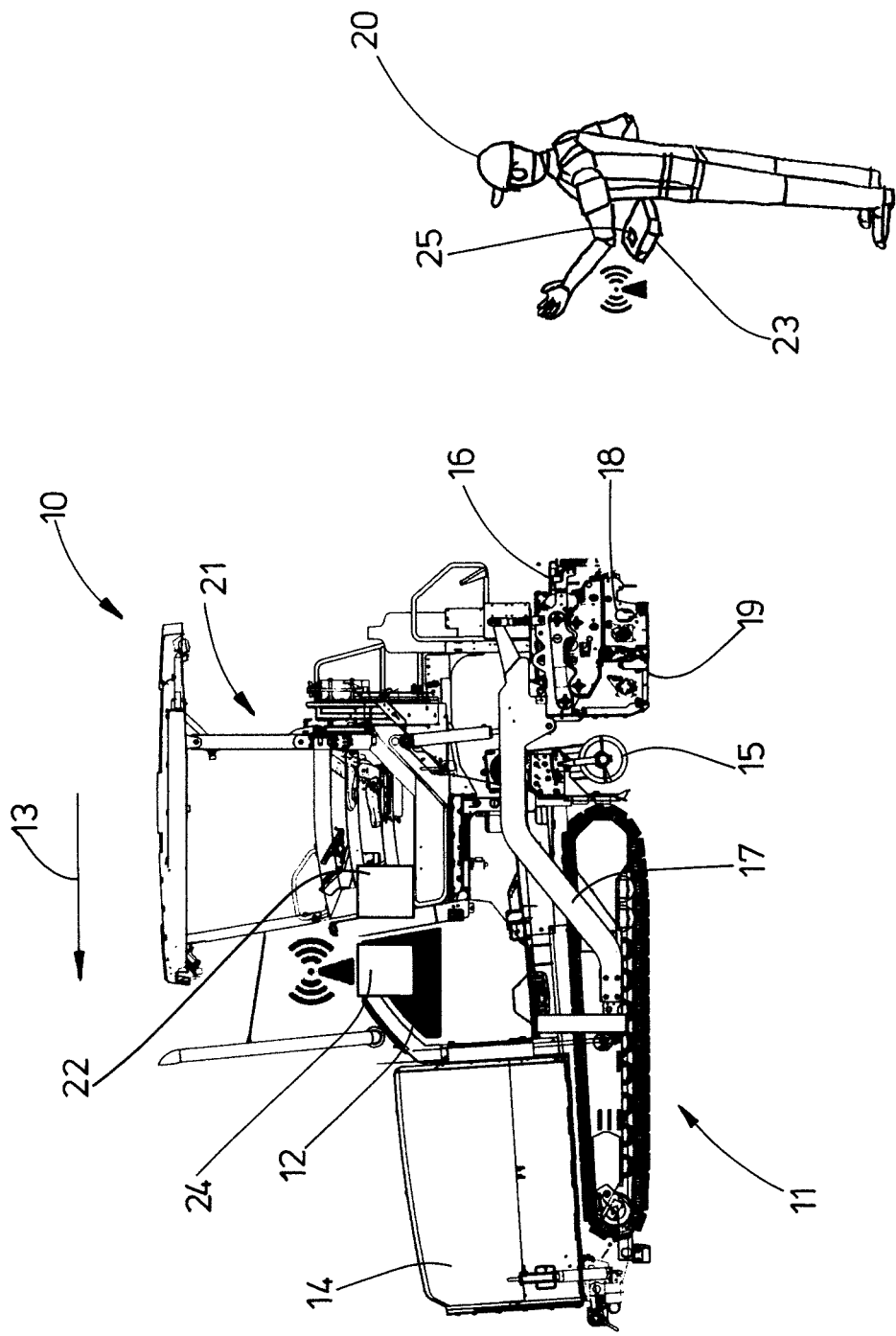

ROADBUILDING MACHINE AND METHOD FOR OPERATING A ROADBUILDING MACHINE

CROSS REFERENCE TO RELATED APPLICATIONS

This patent application claims priority on and the benefit of German Patent Application No. 10 2018 005 387.4 having a filing date of 9 Jul. 2018 and German Patent Application No. 10 2018 005 534.6 having a filing date of 12 Jul. 2018.

BACKGROUND OF THE INVENTION

Technical Field

The invention relates to a method for operating a self-propelled roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, and an operator control station which is arranged above the undercarriage. The invention also relates to a method for operating a self-propelled roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed.

The invention further relates to a roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, and an operator control station which is arranged above the undercarriage, where the undercarriage and the at least one further component can be controlled from the operator control station by an operator. The invention also relates to a roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, where the undercarriage and the at least one further component can be controlled by an operator.

Prior Art

Roadbuilding machines, such as road pavers, feeders, but also road millers, serve for producing and also for removing road coverings composed of, preferably, asphalt but also concrete. Roadbuilding machines of this kind, which are usually self-propelled, have various working components which are permanently associated with them or can be added and, respectively, removed. For example, a road paver has a paving screed with a sliding plate, a tamper blade, a spreading auger, a scraper conveyor with slatted frames and chains and the like. On the contrary, a feeder has a scraper conveyor and a belt conveyor. On the contrary, a road miller has a milling roller or a milling plane. Furthermore, said roadbuilding machines can have a storage container for receiving roadbuilding material, a material conveyor and also an undercarriage which is driven by a drive unit, such as a diesel engine for example. These roadbuilding machines usually also have an operator control station from which an operator controls and, respectively, monitors the roadbuilding machine, together with its components, possibly via a control unit.

For the purpose of operating the roadbuilding machine, the operator is tied to the operator control station in order to control and, respectively, to monitor the building machine and also the individual components via the control unit. However, during the processing of the, in particular hot, roadbuilding material, fumes are released which are unpleasant if the operator stays in the operator control station for a relatively long period of time or which can be harmful over the long term. Since the operator is tied to the operator control station, said operator can work only within a limited area of action. Flexible monitoring of the paving process is not possible owing to the operator being tied to the operator control station.

BRIEF SUMMARY OF THE INVENTION

Proceeding from the above, the object of the present invention is to provide a method for operating a roadbuilding machine and also a roadbuilding machine in which the health risks to the operator during operation are reduced without the paving quality of the roadbuilding material being reduced in the process.

A method for achieving said object is a method for operating a self-propelled roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, and an operator control station which is arranged above the undercarriage, where the undercarriage and the at least one further component are controlled from the operator control station by an operator, wherein the undercarriage and/or at least one further component are remotely controlled by an operator, who is located outside the operator control station, via a transmitting module, where data for control purposes is exchanged between the transmitting module and a receiving module or between the transmitting module and in each case one receiving module of the undercarriage or of the at least one further component. According to said method, provision is made for the undercarriage and/or at least one further component or working component of the roadbuilding machine to be remotely controlled by an operator, who is located outside the operator control station, via a transmitting module. In this case, the data for controlling the undercarriage and/or the at least one further component is exchanged between the transmitting module and a receiving module, in particular of a control unit, or between the transmitting module and in each case one receiving module of the undercarriage or of the at least one further component. Owing to this remote control, the operator can also be located outside the operator control station at a distance from the roadbuilding machine and is therefore at least not directly exposed to the harmful influences of the roadbuilding machine. Furthermore, the operator is provided with spatial flexibility which allows him to walk around the roadbuilding machine during operation thereof in order to monitor all components as precisely as possible and, respectively, to check the paving process of the building machine in particular detail. In this case, the transmitting module can be designed as a handheld device with an integrated processor and suitable transmitting and receiving means and also input means.

A further method for achieving said object is a method for operating a self-propelled roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, where the undercarriage and the at least one further component are controlled by an operator, wherein the undercarriage and/or at least one further component are remotely controlled by an operator, who is not located on the roadbuilding machine, via a transmitting module, where data for control purposes is exchanged between the transmitting module and a receiving module or between the transmitting module and in each case one receiving module of the undercarriage or the at least one further component. According to said method, provision is made for an undercarriage and/or at least one further component of the roadbuilding machine to be remotely controlled by an operator, who is located away from the roadbuilding machine, via a transmitting module, where data for control purposes is exchanged between the transmitting module and a receiving module or between the transmitting module and in each case one receiving module of the undercarriage or the at least one further component. In this case, the data for controlling the undercarriage and/or the at least one further component is exchanged between the transmitting module and a receiving module, in particular of a control unit, or between the transmitting module and in each case one receiving module of the undercarriage or of the at least one further component. Owing to this remote control, the operator who is located away from the roadbuilding machine is not exposed to the harmful influences of the roadbuilding machine. Furthermore, the operator is provided with spatial flexibility which allows him to walk around the roadbuilding machine during operation thereof in order to monitor all components as precisely as possible and, respectively, to check the paving process of the building machine in particular detail. In this case, the transmitting module can be designed as a handheld device with an integrated processor and suitable transmitting and receiving means and also input means.

Furthermore, a further advantageous exemplary embodiment of the present invention may consist in that a CAN bus system, in particular of a control unit, of the roadbuilding machine, preferably a CAN bus system of the undercarriage or of the at least one further component, is directly actuated by the transmitting module for exchanging data for controlling the undercarriage and/or at least one further component. Owing to this direct actuation of the CAN bus system, it is possible for the operator to directly access the function of the individual components and, respectively, of the undercarriage for control and, respectively, monitoring purposes. It is also conceivable for the connection between the transmitting module and the receiving module to be reprogrammed depending on requirements, so that the transmitting module can also communicate with other CAN bus protocols of individual components and, respectively, of the roadbuilding machine.

In addition, provision can preferably be made, before the execution of a control command, for the transmitting module to be identified, in particular verified, by the receiving module, in particular of a control unit, or by the receiving module of the undercarriage or of the at least one further component. Therefore, it is possible to ensure, for example on a building site on which several building machines are being operated using the method described here, that a roadbuilding machine is operated only with the one transmitting module which is provided for this building machine. By way of example, the exchange of a security code or of a corresponding identifier can be provided for the purpose of identification or verification between the transmitting module and the receiving modules. The commands which are transmitted by the transmitting module are executed by the undercarriage or one of the other components only after successful verification or identification by, possibly, a control unit. If the transmitting module has not been successfully identified or verified, this can be reported by an acoustic or an optical signal. Corresponding signaling means for generating this signal can be associated, for example, with the transmitting module, so that the person carrying said transmitting module is directly informed of the unsuccessful verification.

The invention can preferably also make provision for individual control commands to be transmitted to the receiving module, in particular of a control unit, or to the receiving module of the undercarriage or of the at least one further component by the transmitting module, or for groups of several control commands to be transmitted, where several commands are executed in an automated manner, preferably in a defined order, by the group of control commands. Said groups of control commands can be compiled, for example by a planning office, before commissioning of the roadbuilding machine. Therefore, several individual commands can be compiled to form a routine or group for the execution of a specific working step, such as levelling the paving screed for example. Owing to said programming of groups of commands, a complete working step can be initiated and, respectively, executed by a single command.

A preferred development of the apparatus of the present invention can consist in the data being exchanged between the receiving module and the transmitting module in a wireless manner. The wireless exchange can be performed, in particular, via radio, laser, WLAN or the like. Owing to this wireless transmission of the commands, the operator is yet more flexible since his radius of action is not restricted by the length of a cable. As an alternative, it is also conceivable for the transmitting module to be connected to the receiving module via a cable. A wired connection of this kind has the advantage that the connection is particularly secure and the transmitting module can also be supplied with electrical energy in addition to the rapid exchange of data.

Furthermore, provision can preferably be made for the transmitting module to be placed into a receiving apparatus on the roadbuilding machine, in particular the operator control station, for direct data transmission with the receiving module and/or for charging an energy store of the transmitting module. Owing to the transmitting module being received in the receiving apparatus in this way, the transmitting module can also be used as a conventional control device from the roadbuilding machine or the operator control station. Therefore, if the situation requires or permits, the roadbuilding machine can also be controlled and, respectively, monitored in a conventional manner directly from the roadbuilding machine or the operator control station. If the control arrangement allows, the operator can therefore then remove the transmitting module from the receiving apparatus and move from the roadbuilding machine or the operator control station to the area closely surrounding the roadbuilding machine, specifically without giving up the option of monitoring and, respectively, controlling the roadbuilding machine. The energy store, in particular the rechargeable battery, of the transmitting module is charged while the transmitting module is positioned in the receiving apparatus. After operation of the roadbuilding machine is complete, the operator can be requested by the transmitting module to place said transmitting module back into the receiving apparatus on the operator control station. The rechargeable battery is likewise charged with electrical energy during this standby mode.

The present invention can further make provision for the commands which are transmitted by the transmitting module to be categorized into driving commands, working commands and special commands. Various commands can be associated with these individual command categories. For example, commands relating to the acceleration and steering of the building machine and also the choice of speed are covered by the "driving commands" category. Commands relating to the material conveying rate, the paving width, the paving thickness, the paving rate and the like are covered by the "working commands" category. Commands relating to the transportation or to the driving of the building machine on a road and the like are covered by the "special commands" category.

A further advantageous exemplary embodiment of the present invention can consist in feedback signals being transmitted from the receiving module to the transmitting module when a command is not compatible with a preceding command, or the state of the roadbuilding machine, in particular of the undercarriage and/or of the at least one further component, does not permit the execution of the command. If, for example, it is established that the material storage container of the road paver is empty, no roadbuilding material can be transported in front of the paving screed—as seen in the paving direction. Rather, the transportation of the roadbuilding material in front of the paving screed can be initiated only when there is enough roadbuilding material in the storage container. Malfunctions in the remote control of the roadbuilding machine can be avoided owing to this creation of a feedback signal. In particular, if the operator does not stay in the direct vicinity of the roadbuilding machine, an undesired interruption in operation can be avoided by feedback signals or information of said kind. Furthermore, it is conceivable for the operator to continuously receive feedback relating to the states of the individual components of the roadbuilding machine via the transmitting module and for any shortage in roadbuilding material to be identified at an early stage and for corresponding countermeasures to be initiated.

A roadbuilding machine for achieving the object mentioned at the outset is a roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, and an operator control station which is arranged above the undercarriage, where the undercarriage and the at least one further component can be controlled from the operator control station by an operator, characterized by a transmitting module and a receiving module or a receiving module of the undercarriage or of the at least one further component, where the undercarriage or the at least one further component can be remotely controlled by an operator, who is located outside the operator control station, via the transmitting module. According to said roadbuilding machine, provision is made for a transmitting module and a receiving module, in particular of a control unit, or of the undercarriage or of the at least one further component to be associated with the building machine. In this case, the undercarriage or the at least one further component can be remotely controlled by an operator, who is located outside the operator control station, via the transmitting module. In this case, the transmitting module can be designed as a box-like handheld device. Equally, it is conceivable for the functions which can be executed by means of the transmitting module to also be able to be transmitted as software or an app on a mobile radio device or a tablet computer, so that said devices can be used as a transmitting module for remotely controlling the roadbuilding machine.

A further exemplary embodiment of a roadbuilding machine for achieving the object mentioned at the outset is a roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, where the undercarriage and the at least one further component can be controlled by an operator, characterized by a transmitting module and a receiving module or a receiving module of the undercarriage or of the at least one further component, where the undercarriage or the at least one further component can be remotely controlled by an operator, who is located next to the roadbuilding machine, via the transmitting module. According to said roadbuilding machine, provision is made for a transmitting module and a receiving module, in particular of a control unit, or of the undercarriage or of the at least one further component to be associated with the building machine. In this case, the undercarriage or the at least one further component can be remotely controlled by an operator, who is located away from or next to the roadbuilding machine, via the transmitting module. In this case, the transmitting module can be designed as a box-like handheld device. Equally, it is conceivable for the functions which can be executed by means of the transmitting module to also be able to be transmitted as software or an app on a mobile radio device or a tablet computer, so that said devices can be used as a transmitting module for remotely controlling the roadbuilding machine.

The transmitting module and, respectively, the corresponding electrical device can communicate with the receiving module of the roadbuilding machine by means of radio, laser, WLAN or the like. This communication is preferably encrypted communication in order to suppress unauthorized interventions in operation of the roadbuilding machine in particular. Furthermore, communication between the transmitting module and the receiving module is only possible if a corresponding identifier or the exchange of verification codes has taken place beforehand.

Although provision is made for the transmitting module to be used as a kind of remote operator control arrangement for remotely controlling the roadbuilding machine, said transmitting module can also be docked in a corresponding receptacle on the roadbuilding machine or the operator control station of the roadbuilding machine in order to operate the roadbuilding machine in a conventional manner. In the state in which it is docked on the roadbuilding machine or on the operator control station, the transmitting module can be operated like a known control unit. Therefore, it is not necessary to retrain the operator to operate the transmitting module. Rechargeable batteries of the transmitting module can be charged while the transmitting module is docked in the receptacle. The data exchange between the transmitting module and the receiving unit can also be performed in a wireless manner in this state. However, preference is therefore given to the data transfer being performed in a wired manner in the docked state.

The transmitting module can have a monitoring means for displaying input commands and/or for displaying an identifier of a selected roadbuilding machine. This monitoring means may be a display or a means for generating an acoustic, visual or vibratory and, respectively, haptic signal. A display of this kind can also serve to display said feedback signals of the receiving module. If a command which is transmitted by the transmitting module to the receiving module is not compatible with a preceding command, or the state of the roadbuilding machine does not permit the execution of the command, this can likewise be displayed by the display. Furthermore, provision can be made for states or operating parameters or production parameters to be able to be displayed on the display at any time. Therefore, all information which is necessary for operating the roadbuilding machine is accessible to the operator irrespective of his location relative to the roadbuilding machine.

BRIEF DESCRIPTION OF THE DRAWING

A preferred exemplary embodiment of the present invention will be explained in more detail below with reference to the drawing.

The single FIGURE of the drawing, FIG. 1, shows a side view of a road paver together with an operator.

DETAILED DESCRIPTION OF PREFERRED EMBODIMENTS

In order to describe the method according to the invention for operating a roadbuilding machine, FIG. 1, illustrates, by way of example, a road paver 10. However, it should be expressly pointed out at this stage that the present invention is not restricted to the use for a road paver but rather can also be seen in connection with other roadbuilding machines, such as a feeder, a road miller or the like for example.

The road paver 10 illustrated by way of example in the FIGURE has an undercarriage 11 which is designed as a tracked undercarriage in the exemplary embodiment shown. However, the undercarriage 11 of the road paver 10 can also be designed as a wheeled undercarriage. The road paver 10 is of self-propelled design. To this end, the undercarriage 11 is driven by a drive unit 12 in such a way that the road paver 10 can be moved forward in the paving direction 13. It goes without saying that the road paver 10 can also be driven in such a way that a movement counter to the paving direction 13 takes place.

A storage container 14 of tub-like or trough-like design is arranged in front of the drive unit 12 as seen in the paving direction 13. The storage container 14 serves to receive a store of the material which serves for producing the road covering, in particular an asphalt mixture. The material is transported from the storage container 14, counter to the paving direction 13, to the rear side of the road paver 10, specifically in front of a spreading auger 15, by a conveyor, not shown in the FIGURE, in particular a scraper conveyor. The spreading auger 15 is arranged behind the drive unit 12. The spreading auger 15 extends transversely in relation to the paving direction 13 and serves to uniformly spread the material over the entire working width of the road paver 10.

A paving screed 16 is arranged behind the spreading auger 15 as viewed in the paving direction 13. The paving screed 16 is suspended from supporting arms 17 such that it can move up and down. The supporting arms 17 are mounted in a pivotable manner on the undercarriage 11. The paving screed 16 may be a one-piece paving screed 16 which cannot be varied in terms of width or a multiple-piece paving screed comprising a main screed and lateral shifting screeds, as a result of which the width of the paving screed and therefore the paving width can be varied.

The paving screed 16 has a screed main body 18 with a sliding plate 19 arranged beneath said screed main body. The paving screed 16 rests, by way of the bottom side of its sliding plate 19, on the material to be paved.

The drive unit 12 of the road paver 10 has an internal combustion engine. Said internal combustion engine is preferably a diesel engine. However, the drive unit 12 can also have other motors, possibly even several motors. Furthermore, the drive unit 12 has at least one hydraulic pump which is driven by the internal combustion engine. In this way, the required energy is supplied to hydraulic drives, in particular hydraulic motors. In addition or as an alternative, it is also conceivable for the internal combustion engine to drive at least one generator which generates current for electric drives, in particular electric motors.

Operation of the road paver 10 and also the control and the monitoring of the listed components, such as the undercarriage 11, the drive unit 12, the storage container 14, the spreading auger 15, the paving screed 16, the supporting arms 17 and the like for example, can be controlled and, respectively, monitored from an operator control station 21 by an operator 20. To this end, a control unit 22 for example is arranged in the operator control station 21. Operation of the entire road paver 10 can be supervised and, respectively, monitored by said control unit 22. In this case, the control unit 22 can be connected to any individual one of said components via a CAN bus system. However, it is also conceivable for the road paver 10 or the roadbuilding machine to not have an operator control station 21, but rather to be designed such that it can be at least virtually completely remotely controlled.

However, as an alternative, the control and, respectively, monitoring of the road paver 10 and also of any individual ones of said components can also be performed via a transmitting module 23. Via this transmitting module 23, data or commands for operating the road paver 10 can be performed via a receiving module 24 which is associated with the road paver 10. In this case, provision can be made for said receiving module 24 to be directly connected to the control unit 22 and to communicate with the individual components by means of the CAN bus system via said control unit 22. However, equally, provision can also be made for each individual one of said components of the road paver 10 to have a corresponding dedicated receiving module 24 for communicating with the transmitting module 23. The communication between the receiving module 24 and the transmitting module 23 can take place in a wireless manner. This provides the advantage that the operator 20 is not tied to the operator control station 21, but rather can remotely control operation of the road paver 10 virtually irrespective of his location. The operator 20 can either actuate the individual components or directly access the individual components by means of the control unit 22 via the transmitting module 23.

For the purpose of easier input and, respectively, for more convenient control of the road paver 10 via the transmitting module 23, said transmitting module can have a display 25 by way of which information can be displayed to the operator 20.

A receptacle for receiving the transmitting module 23 can be associated with the road paver 10 or the operator control station 21, in particular the control unit 22. Said receptacle is designed in such a way that the transmitting module 23 can be mated with the receptacle in such a way that, in the coupled state, it can serve as an input panel for the control unit 22 on the operator control station 21. With the transmitting module 23 mated with the receptacle in this way, the road paver 10 can be operated in the known manner. Equally, a rechargeable energy store, in particular a rechargeable battery, of the transmitting module 23 is charged in said state. The data is exchanged directly, that is to say in a wired manner, between the transmitting module 23 and the control unit 22 in this coupled state.

If necessary or expedient or possible, the operator 20 can remove the transmitting module 23 from the receptacle and move away from the road paver 10 or the operator control station 21. In this case, the range for the wireless communication between the transmitting module 23 and the receiving module 24 can be adjusted. Encrypted transmission of the data between the transmitting module 23 and the receiving module 24 can prevent the data transfer being disrupted or mixed up with other building machines.

Before commissioning of the road paver 10, it is necessary to verify using the control unit 22 that the transmitting module 23 used is authorized to communicate with the receiving module 24. This can be done, for example, by exchanging an identifier.

Before commissioning of the road paver 10, various command routines or command sequences or groups of commands can be stored in the transmitting module 23 and also in the receiving module 24. For example, protocols or operating sequences which can be initiated by a simple key combination, specifically preferably in a remotely controlled manner, can be prepared for the respective work to be carried out. As a result, firstly the course of operation can be simplified and secondly operator control convenience for the operator 20 can be improved in this way since the person 20 does not have to continuously stay with the road paver 10 or in the operator control station 21. As a result, the time for which the operator 20 has to stay directly with the road paver 10 can also be reduced at the same time.

LIST OF REFERENCE SYMBOLS

10 Road paver
11 Undercarriage
12 Drive unit
13 Paving direction
14 Storage container
15 Spreading auger
16 Paving screed
17 Supporting arm
18 Screed main body
19 Sliding plate
20 Operator
21 Operator control station
22 Control unit
23 Transmitting module
24 Receiving module
25 Display

What is claimed is:

1. A method for operating a self-propelled roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, and an operator control station which is arranged above the undercarriage, where the undercarriage and the at least one further component are controlled from the operator control station by an operator, comprising:

remotely controlling the undercarriage and/or at least one further component by an operator, who is located outside the operator control station, via a transmitting module, where data for control purposes is exchanged between the transmitting module and a receiving module or between the transmitting module and in each case one receiving module of the undercarriage or of the at least one further component, before the execution of a control command, identifying the transmitting module, in particular verifying, by the receiving module, in particular of a control unit, or by the receiving module of the undercarriage or of the at least one further component, and transmitting individual control commands to the receiving module, in particular of a control unit, or to the receiving module of the undercarriage or of the at least one further component by the transmitting module, or transmitting groups of several control commands, where several commands are executed in an automated manner by the group of control commands.

2. The method for operating a self-propelled roadbuilding machine as claimed in claim 1, wherein a controller area network bus system, in particular of a control unit of the roadbuilding machine, preferably a controller area network bus system of the undercarriage or of the at least one further component, is directly actuated by the transmitting module for exchanging data for controlling the undercarriage and/or at least one further component.

3. The method for operating a self-propelled roadbuilding machine as claimed in claim 1, wherein the data is exchanged between the receiving module and the transmitting module in a wireless manner, in particular via radio, laser, wireless local area network or the like, or in a wired manner.

4. The method for operating a self-propelled roadbuilding machine as claimed in claim 1, wherein the transmitting module is placed into a receiving apparatus on the operator control station for direct data transmission with the receiving module and/or for charging an energy store of the transmitting module.

5. The method for operating a self-propelled roadbuilding machine as claimed in claim 1, wherein feedback signals are transmitted from the receiving module to the transmitting module when a command is not compatible with a preceding command, or the state of the roadbuilding machine, in particular of the undercarriage and/or of the at least one further component, does not permit the execution of the command.

6. A method for operating a self-propelled roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, where the undercarriage and the at least one further component are controlled by an operator, comprising:

remotely controlling the undercarriage and/or at least one further component by an operator, who is not located on the roadbuilding machine, via a transmitting module, where data for control purposes is exchanged between the transmitting module and a receiving module or between the transmitting module and in each case one receiving module of the undercarriage or the at least one further component, before the execution of a control command, identifying the transmitting module, in particular verifying, by the receiving module, in particular of a control unit, or by the receiving module of the undercarriage or of the at least one further component, and transmitting individual control commands to the receiving module, in particular of a control unit, or to the receiving module of the undercarriage or of the at least one further component by the transmitting module, or transmitting groups of several control commands, where several commands are executed in an automated manner by the group of control commands.

7. The method for operating a self-propelled roadbuilding machine as claimed in claim 6, wherein a controller area network bus system, in particular of a control unit of the roadbuilding machine, preferably a controller area network bus system of the undercarriage or of the at least one further component, is directly actuated by the transmitting module for exchanging data for controlling the undercarriage and/or at least one further component.

8. The method for operating a self-propelled roadbuilding machine as claimed in claim 6, wherein the data is exchanged between the receiving module and the transmitting module in a wireless manner, in particular via radio, laser, wireless local area network or the like, or in a wired manner.

9. The method for operating a self-propelled roadbuilding machine as claimed in claim 6, wherein the transmitting module is placed into a receiving apparatus on an operator control station for direct data transmission with the receiving module and/or for charging an energy store of the transmitting module.

10. The method for operating a self-propelled roadbuilding machine as claimed in claim 6, wherein feedback signals are transmitted from the receiving module to the transmitting module when a command is not compatible with a preceding command, or the state of the roadbuilding machine, in particular of the undercarriage and/or of the at least one further component, does not permit the execution of the command.

11. A roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, and an operator control station which is arranged above the undercarriage, where the undercarriage and the at least one further component are controllable from the operator control station by an operator, and a transmitting module and a receiving module or a receiving module of the undercarriage or of the at least one further component, where the undercarriage or the at least one further component is remotely controllable by an operator, who is located outside the operator control station, via the transmitting module, wherein the transmitting module is assigned to a receptacle on the operator control station of the roadbuilding machine for data transfer and/or for charging an energy store of the transmitting module, wherein the transmitting module has a monitoring means for displaying input commands and/or feedback signals of the receiving module when a command which is transmitted from the transmitting module to the receiving module is not compatible with a preceding command, or the state of the roadbuilding machine, in particular of the undercarriage and/or of the at least one further component, does not permit the execution of the command, and wherein the monitoring means is a display or a means for generating an acoustic, visual or vibratory and, respectively, haptic signal.

12. The roadbuilding machine as claimed in claim 11, wherein the transmitting module and the at least one receiving module have means for wireless data transmission, in particular by radio, laser, wireless local area network or the like.

13. A roadbuilding machine, in particular a road paver or a feeder, for producing a road covering comprising an undercarriage, which has driven tires or tracks, and/or at least one further component, such as at least one material conveyor, one storage container for roadbuilding material, one spreading auger and/or one paving screed, where the undercarriage and the at least one further component is controllable by an operator, and a transmitting module and a receiving module or a receiving module of the undercarriage or of the at least one further component, where the undercarriage or the at least one further component are remotely controllable by an operator, who is located next to the roadbuilding machine, via the transmitting module, wherein the transmitting module is assigned to a receptacle on an operator control station of the roadbuilding machine for data transfer and/or for charging an energy store of the transmitting module, wherein the transmitting module has a monitoring means for displaying input commands and/or feedback signals of the receiving module when a command which is transmitted from the transmitting module to the receiving module is not compatible with a preceding command, or the state of the roadbuilding machine, in particular of the undercarriage and/or of the at least one further component, does not permit the execution of the command, and wherein the monitoring means is a display or a means for generating an acoustic, visual or vibratory and, respectively, haptic signal.

14. The roadbuilding machine as claimed in claim 13, wherein the transmitting module and the at least one receiving module have means for wireless data transmission, in particular by radio, laser, wireless local area network or the like.

\* \* \* \* \*